(12) United States Patent
Lopez et al.

(10) Patent No.: US 10,603,716 B2
(45) Date of Patent: Mar. 31, 2020

(54) SYSTEMS INCLUDING VIBRATION SYSTEMS FOR FILLING INCOMPLETE COMPONENTS WITH SLURRY MATERIAL

(71) Applicant: General Electric Company, Schenectady, NY (US)

(72) Inventors: Jose Troitino Lopez, Greenville, SC (US); Raymond Michael Brown, Greer, SC (US); Travis J Packer, Simpsonville, SC (US); James Stuart Pratt, Simpsonville, SC (US); William Charles Vincent, Greenville, SC (US)

(73) Assignee: General Electric Company, Schenectady, NY (US)

( * ) Notice: Subject to any disclaimer, the term of this patent is extended or adjusted under 35 U.S.C. 154(b) by 407 days.

(21) Appl. No.: 15/675,941

(22) Filed: Aug. 14, 2017

(65) Prior Publication Data

US 2019/0047043 A1 Feb. 14, 2019

(51) Int. Cl.
*B22D 27/08* (2006.01)
*B06B 1/10* (2006.01)
*B06B 1/00* (2006.01)
*G05D 7/00* (2006.01)

(52) U.S. Cl.
CPC .............. *B22D 27/08* (2013.01); *B06B 1/10* (2013.01); *B06B 1/00* (2013.01); *B06B 2201/70* (2013.01); *B29C 2791/008* (2013.01); *G05D 7/00* (2013.01)

(58) Field of Classification Search
CPC ....... B22D 27/08; B06B 1/10; B06B 2201/70; B06B 1/00; G05D 7/00; B29C 2791/008

USPC .......................................................... 366/111
See application file for complete search history.

(56) References Cited

U.S. PATENT DOCUMENTS

| | | | | |
|---|---|---|---|---|
| 1,785,757 A | * | 12/1930 | Young ................... | B22D 27/08 366/111 |
| 1,908,104 A | * | 5/1933 | Bell ....................... | B22D 27/08 74/26 |
| 5,413,472 A | * | 5/1995 | Dietterich ............ | A63H 33/001 249/102 |
| 5,902,528 A | * | 5/1999 | Spragg ................... | B28B 1/44 249/144 |
| 5,985,207 A | | 11/1999 | Vawter | |

* cited by examiner

*Primary Examiner* — Huy Tram Ngyuen
(74) *Attorney, Agent, or Firm* — Dale Davis; Hoffman Warnick LLC

(57) ABSTRACT

Vibration systems and systems including vibration systems for filling incomplete components with slurry material are disclosed. The vibration systems may include a vibration platform, and a component retention plate releasably coupled to the vibration platform. The component retention plate may include a plurality of component holders positioned on the component retention plate. Each of the plurality of component holders may receive a distinct, incomplete component in a predetermined orientation. The vibration systems may also include a motor operatively coupled to the vibration platform to vibrate the vibration platform at a predetermined frequency. The predetermined frequency may be based on characteristic(s) of each of the incomplete components.

19 Claims, 7 Drawing Sheets

SYSTEMS INCLUDING VIBRATION SYSTEMS FOR FILLING INCOMPLETE COMPONENTS WITH SLURRY MATERIAL

BACKGROUND OF THE INVENTION

The disclosure relates generally to component manufacturing systems and processes, and more particularly, to systems including vibration systems for at least partially filling incomplete components with slurry material.

The process of manufacturing components continues to evolve. In the manufacturing industry, manufactures continuously strive to find new and innovative ways to manufacture components with improved build and/or operation qualities. For example, components may be manufactured by initially forming hollow-shell components, and subsequently adding additional material(s) to fill or complete the shell components. This may allow manufactures to create components with improved operational qualities (e.g., heat resistance) as a result of the component having distinct materials formed in distinct portions (e.g., high-heat resistant material formed as shell, more ductile material formed in core to reduce fatigue). In other non-limiting examples, components may include selectively formed gaps or hollows, which may provide the component the ability to flex, grow, and/or expand-contract during manufacturing processes. This may reduce the stress on the component during the manufacturing processes, which may ultimately reduce the risk of the components being undesirably damaged during the manufacturing processes.

However the processes of filling shells and/or hollows in a component may create unique problems in the manufacturing process. For example, when the material is deposited to fill the hollow shell and/or the hollow or gap formed in a component, air bubbles and/or air pockets may be formed and/or trapped within the material. That is, as the material is deposited into the hollows or gaps of the component, air pockets may become trapped in the material and may occupy space within the material that should be occupied by deposited material. If not removed from the material, the air bubbles or air pockets can cause impurities and/or irregularities in the finished component. That is, the air bubbles in the material that may remain in the final component may create a weakened area within the component. These weakened areas in the component may be more likely to be susceptible to damage and/or failure when using the component, which may in turn reduce the operational life of the component.

BRIEF DESCRIPTION OF THE INVENTION

A first aspect of the disclosure provides a vibration system, including: a vibration platform; a component retention plate releasably coupled to the vibration platform, the component retention plate including: a plurality of component holders positioned on the component retention plate, each of the plurality of component holders receiving a distinct, incomplete component in a predetermined orientation; and a motor operatively coupled to the vibration platform to vibrate the vibration platform at a predetermined frequency based on a characteristic of each of the incomplete components.

A second aspect of the disclosure provides a system, including: a vibration system including: a vibration platform; a component retention plate releasably coupled to the vibration platform, the component retention plate including: a plurality of component holders positioned on the component retention plate, each of the plurality of component holders receiving a distinct, incomplete component in a predetermined orientation; and a motor operatively coupled to the vibration platform to vibrate the vibration platform at a predetermined frequency based on a characteristic of each of the incomplete components; and a material dispensing system in communication with the component retention plate of the vibration system, the material dispensing system including: a cartridge holding a predetermined amount of a slurry material; a delivery conduit fluidly communicating the slurry material from the cartridge to each of the incomplete components received by the plurality of component holders position on the component retention plate; and a valve in fluid communication with the delivery conduit to control the flow of the slurry material from the cartridge.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
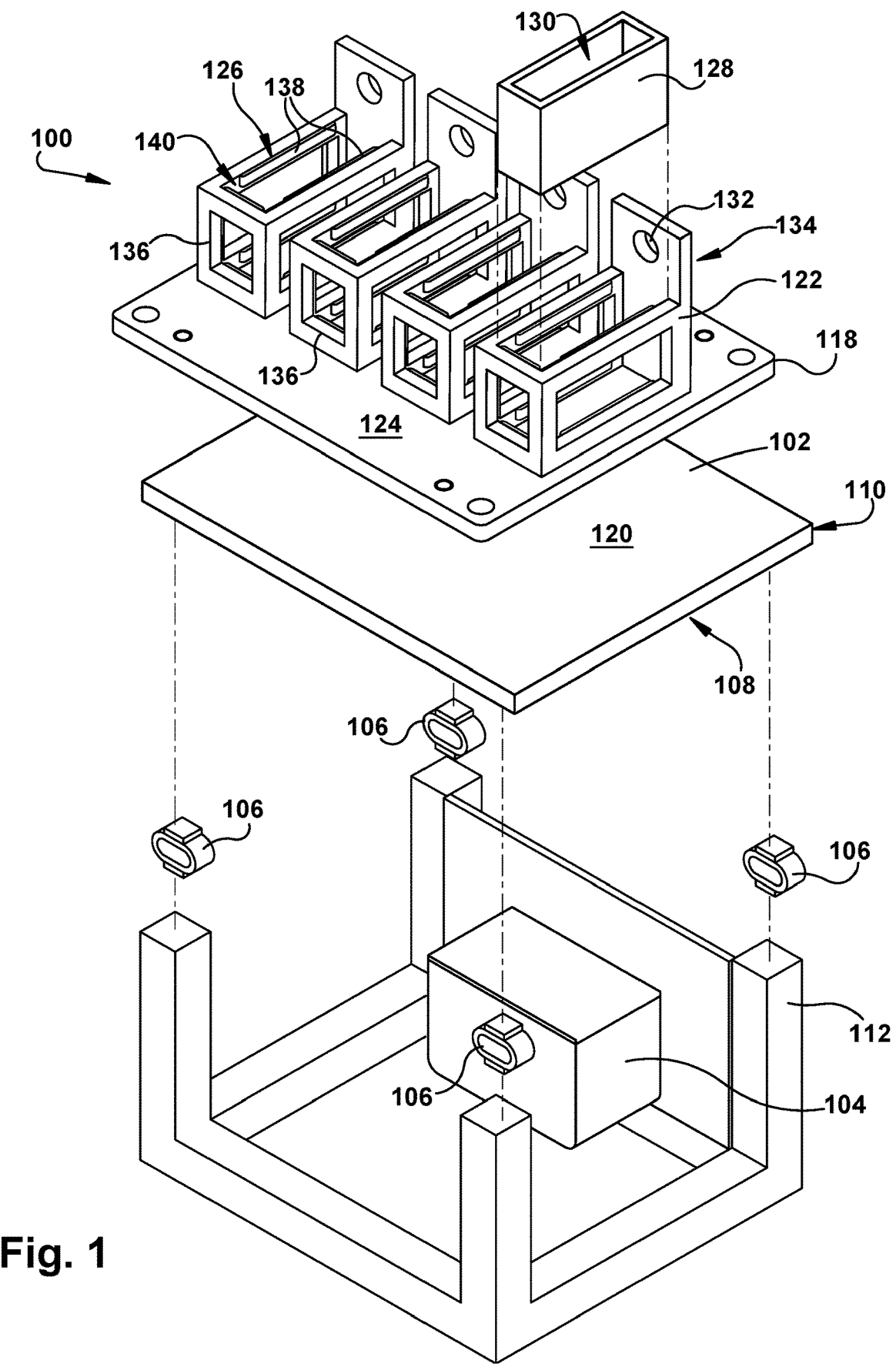
FIG. 1 shows an exploded, perspective view of a vibration system and a plurality of incomplete components, according to embodiments of the disclosure.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure it will become necessary to select certain terminology when referring to and describing relevant machine components within the disclosure. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

The following disclosure relates generally to component manufacturing systems and processes, and more particularly, to systems including vibration systems for at least partially filling incomplete components with slurry material.

These and other embodiments are discussed below with reference to FIGS. 1-9. However, those skilled in the art will readily appreciate that the detailed description given herein with respect to these Figures is for explanatory purposes only and should not be construed as limiting.

FIG. 1 shows an exploded, perspective view of a vibration system 100. Vibration system 100 may include various features, apparatuses, assemblies, and/or functions to aid in the creation and/or manufacturing of components. As discussed herein, vibration system 100, and at least a portion of its various features, may also be configured to vibrate the components during the manufacturing process to improve the build quality and/or build characteristics of the final component.

As shown in FIG. 1, vibration system 100 may include a vibration platform 102, and a motor 104. Motor 104 may be operatively coupled to vibration platform 102 to vibrate vibration platform 102 at a predetermined vibration frequency as discussed herein. That is, motor 104 may be connected to, coupled to, and/or in communication with vibration platform 102 in order to provide a vibration force to vibration platform 102 such that vibration platform 102 vibrates at a predetermined vibration frequency during a manufacturing process. As discussed herein, the predetermined vibration frequency may be based, at least in part, on characteristic(s) of a component being manufactured using vibration system 100. Motor 104 may be configured to vibrate vibration platform 102 in at least one direction (D) during the manufacturing process. In a non-limiting example shown in FIG. 1, motor 104 may vibrate and/or move vibration platform 102 in a plurality of directions (D1, D2, D3) and/or any combination of the plurality of directions (D1, D2, D3). As such, motor 104 may be any suitable motor and/or force-emitting device that may be configured to provide a force to and/or vibrate vibration platform 102 at a predetermined frequency. Additionally, vibration platform 102 may be formed from any suitable material that may withstand the vibrations provided by motor 104. Furthermore, and as discussed herein, vibration platform 102 may be formed from any suitable material that may hold and/or support additional features and/or assemblies of vibration system 100. In non-limiting examples, vibration platform 102 may be formed from substantially rigid materials including, but not limited to, metal, metal-alloys, ceramic, polymer, and any other material including substantially similar material characteristics and/or properties.

Vibration system 100 may also include a plurality of dampeners 106. The plurality of dampeners 106 may be positioned below vibration platform 102. More specifically, each of the plurality of dampeners 106 may be positioned below and may be (releasably) coupled, and/or affixed to a bottom surface 108 of vibration plate 102. In a non-limiting example where vibration system 100 includes four dampeners 106, each dampener 106 may be affixed to bottom surface 108 of vibration plate 102 and may be positioned adjacent a respective corner 110 of vibration plate 102. The plurality of dampeners 106 of vibration system 100 may be formed from any suitable element and/or assembly configured to dampen a portion of the vibration of vibration plate 102 during the manufacturing process. That is, and as discussed herein, the plurality of dampeners 106 may be configured to dampen, reduce, isolate, and/or absorb a portion of the vibration of vibration plate 102 when vibration plate 102 is vibrating above the predetermined vibration frequency. In a non-limiting example, the plurality of dampeners 106 may be formed as any suitable vibration-damping sandwich mount. Additionally in non-limiting examples, the plurality of dampeners 106 may include a deflection capacity between approximately 0.05 inches and 0.3 inches.

As shown in FIG. 1, vibration system 100 may also include a rigid base 112. Rigid base 112 may be positioned below and may support the various features, apparatuses, and/or assemblies of vibration system 100. More specifically, rigid base 112 may be positioned below vibration platform 102 and the plurality of dampeners 106, respectively, and may substantially support and/or contact at least the plurality of dampeners 106 and/or vibration plate 102. In the non-limiting example shown in FIG. 1, each of the plurality of dampeners 106 may also be affixed to rigid base 102, such that the plurality of dampeners 106 are positioned between and affixed to vibration plate 102 and rigid base 102. Rigid base 112 may be a stand alone base or table-structure, or alternatively, may include at least one pillar or column that may be configured to support vibration platform 102 and the plurality of dampeners 106 while vibration platform 102 vibrates during the manufacturing process discussed herein. Additionally, to ensure that vibration platform 102 is vibrating at a predetermined vibration frequency, and/or to ensure the plurality of dampeners 106 may dampen the vibration of vibration platform 102, rigid base 112 may be fixed, stationary, anchored, and/or substantially immobile within vibration system 100.

It is understood that the number of dampeners 106 depicted in vibration system 100 is merely exemplary. As such, vibration system 100 may include more or less dampeners 106 than the number of dampeners 106 shown and discussed herein. Additionally, the position of the plurality of dampeners 106 with respect to vibration platform 102, as shown in FIG. 1, is merely exemplary. That is, it is understood that the plurality of dampeners 106 positioned and/or affixed to corners 110 of vibration platform 102 is merely a single example position of the plurality of dampeners 106 within vibration system 100. The position of the plurality of dampeners 106 within vibration system 100 may be dependent, at least in part on, the number of dampeners 106, the size of vibration platform 106, the shape of vibration platform 106, the force output (e.g., Newton (N)) of motor 104 for vibrating vibration platform 102, the shape of rigid base 112, the size of rigid base 112 and the like.

As shown in the non-limiting example of FIG. 1, vibration system 100 may also include a component retention plate 118. Component retention plate 118 may be positioned above vibration platform 102. More specifically, component retention plate 118 may be positioned above, on, and/or may be releasably coupled to top surface 120 of vibration platform 102. Component retention plate 118 may be releasably coupled to top surface 120 of vibration platform 102 using any suitable coupling component, mechanism, and/or coupling technique. In non-limiting examples, component retention plate 118 may be releasably coupled to vibration platform 102 using mechanical fasteners, snap-fits, magnetic couplers, and similar coupling components and/or coupling techniques. As a result of being releasably coupled to vibration platform 102, component retention plate 118 may vibrate with vibration platform 102 during the manufacturing process, as discussed herein. Component retention plate 118 may be formed from any suitable material that may withstand the vibrations of imparted by vibration platform 102, and/or may vibrate along with vibration platform 102. In non-limiting examples, component retention plate 118 may be formed from substantially rigid materials including, but not limited to, metal, metal-alloys, ceramic, polymer, and any other material including substantially similar material characteristics and/or properties.

Component retention plate 118 of vibration system 100 may include a plurality of component holders 122. The plurality of component holders 122 may be positioned and/or formed on a top surface 124 of component retention plate 118. In the non-limiting example shown in FIG. 1, the plurality of component holders 122 may be positioned on top surface 124, and formed integral with and/or may be formed as a part of component retention plate 118. In other non-limiting examples discussed herein, the plurality of component holders 122 may be formed as distinct portions or assemblies that may be releasably coupled to top surface 124 of component retention plate 118 (see, FIG. 4). Each of the plurality of component holders 122 of component retention plate 118 may be configured to receive and substantially hold a respective component 128 being formed and/or manufactured using vibration system 100, as discussed herein. The plurality of component holders 122 of component retention plate 118 may be formed from substantially the same material or distinct material as component retention plate 118; dependent, at least in part, on whether the plurality of component holders 122 were formed integrally with component retention plate 118. In non-limiting examples, the plurality of component holders 122 may be formed from substantially rigid materials including, but not limited to, metal, metal-alloys, ceramic, polymer, and any other material including substantially similar material characteristics and/or properties.

Each of the plurality of component holders 122 may include an aperture 126. As shown in FIG. 1, aperture 126 may be formed through each of the plurality of component holders 122 opposite and above top surface 124 of component retention plate 118. Aperture 126 of each of the plurality of component holders 122 may include a geometry corresponding to an incomplete component 128 that may undergo a manufacturing process utilizing vibration system 100. That is, each of the plurality of component holders 122 may be configured to receive incomplete component 128 via aperture 126, where aperture 126 may include a geometry that may substantially correspond with, compliment and/or be configured to receive or nest incomplete component 128 (see, FIG. 3). In the non-limiting example of FIG. 1, incomplete component 128 may include a substantially rectangular-cubic geometry. As such, aperture 126 formed in each of the plurality of component holders 122 on component retention plate 118 may also include a substantially rectangular-cubic geometry, and the dimensions of the aperture 126 may be minimally (e.g., less than three (3) centimeters) larger than the dimensions of the exterior surface of incomplete component 128. Additionally, and as discussed herein, each of the plurality of component holders 122 may be configured to receive incomplete component 128, via aperture 126, in a predetermined orientation. That is, the plurality of component holders 122 of component retention plate 118 may receive incomplete component 128 and may orient or position incomplete component 128 in a predetermined orientation during the manufacturing process discussed herein.

As shown in FIG. 1, distinct incomplete components 128 may be positioned within and/or received by a corresponding component holder 122 of component retention plate 118. Incomplete component 128 may include at least one gap, hollow, and/or recess 130 (hereafter, "recess 130") formed therein. That is, and as shown in FIG. 1, recess 130 may be formed at least partially through a portion of incomplete component 128, such that incomplete component 128 is formed as a non-solid component. As discussed herein, recess 130 of incomplete component 128 may be substantially filed with a slurry material during the manufacturing process to complete incomplete component 128 and/or make incomplete component 128 a substantially solid component. Also during the manufacturing process, and as discussed herein, incomplete components 128 positioned within component holders 122 of component retention plate 118 may vibrate along with component retention plate 118 and vibration platform 102, respectively.

Recess 130 may be formed in incomplete component 128 for a variety of purposes including, but not limited to, improving incomplete component 128 physical characteristics during the build process, improving physical, material, and/or operational characteristics of the complete component formed from incomplete component 128, and/or so on. In the non-limiting example shown in FIG. 1, recess 130 may be formed in and/or partially through a majority (e.g., greater than 50%) of incomplete component 128. In this non-limiting example, recess 130 may be filled with a material distinct from the material forming incomplete component 128 to substantially improve the physical, material, and/or operational characteristics of incomplete component 128. That is, recess 130 may be filled with a distinct material from the material used to form incomplete component 128. As a result of the material properties of the distinct material filling recess 130, incomplete component 128, including filled recess 130 (e.g., a complete component), may have improved physical, material, and/or operational characteristics over a component only formed from the single material used to form incomplete component 128. In other non-limiting examples, recess 130 or a plurality of recesses 130 may be formed only in a minimal portion (e.g., less than 15%) of incomplete component 128 to provide flexibility and/or the ability for incomplete component 128 to flex, grow, and/or expand/contract during earlier manufacturing processes (e.g., casting, firing, annealing, sintering, curing, and so on) forming incomplete component 128.

Figure 2:
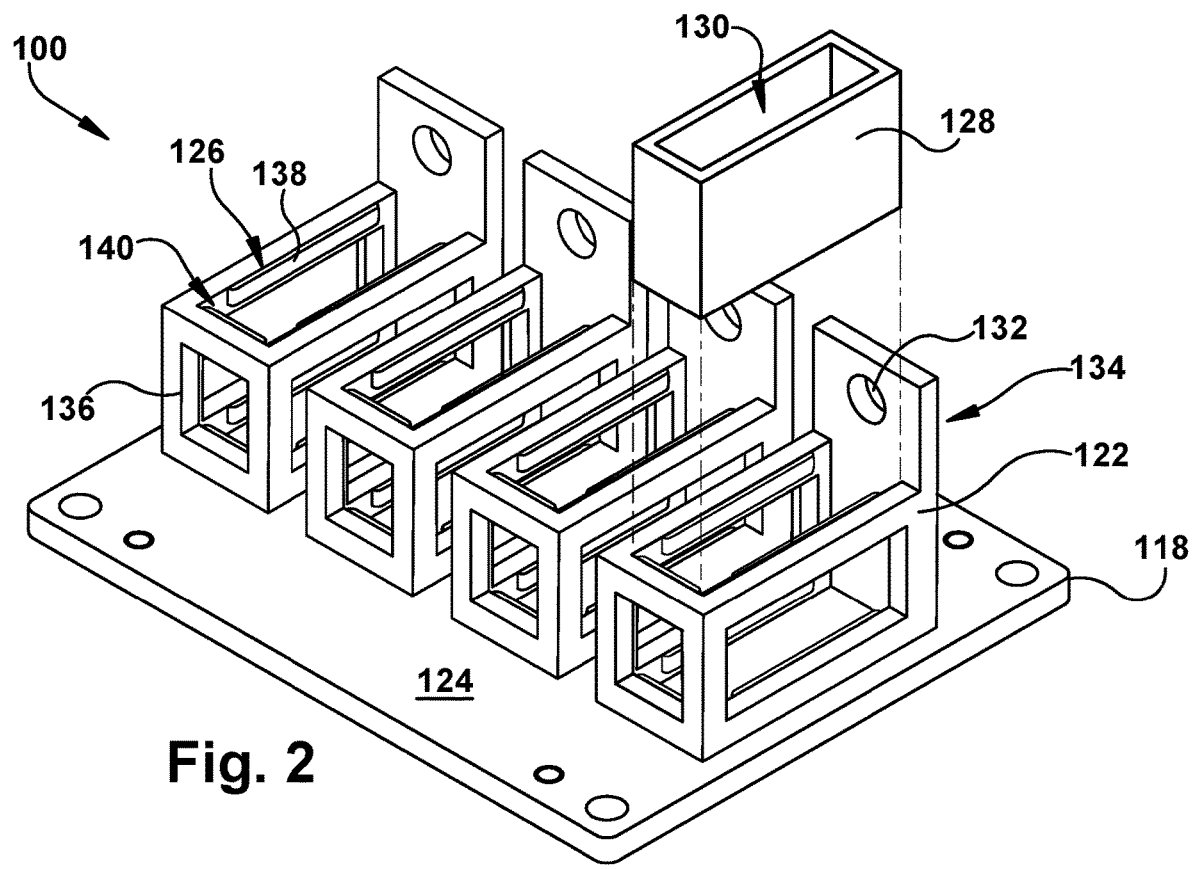
FIG. 2 shows a perspective view of a component retention plate of the vibration system of FIG. 1, according to embodiments of the disclosure.
Figure 3:
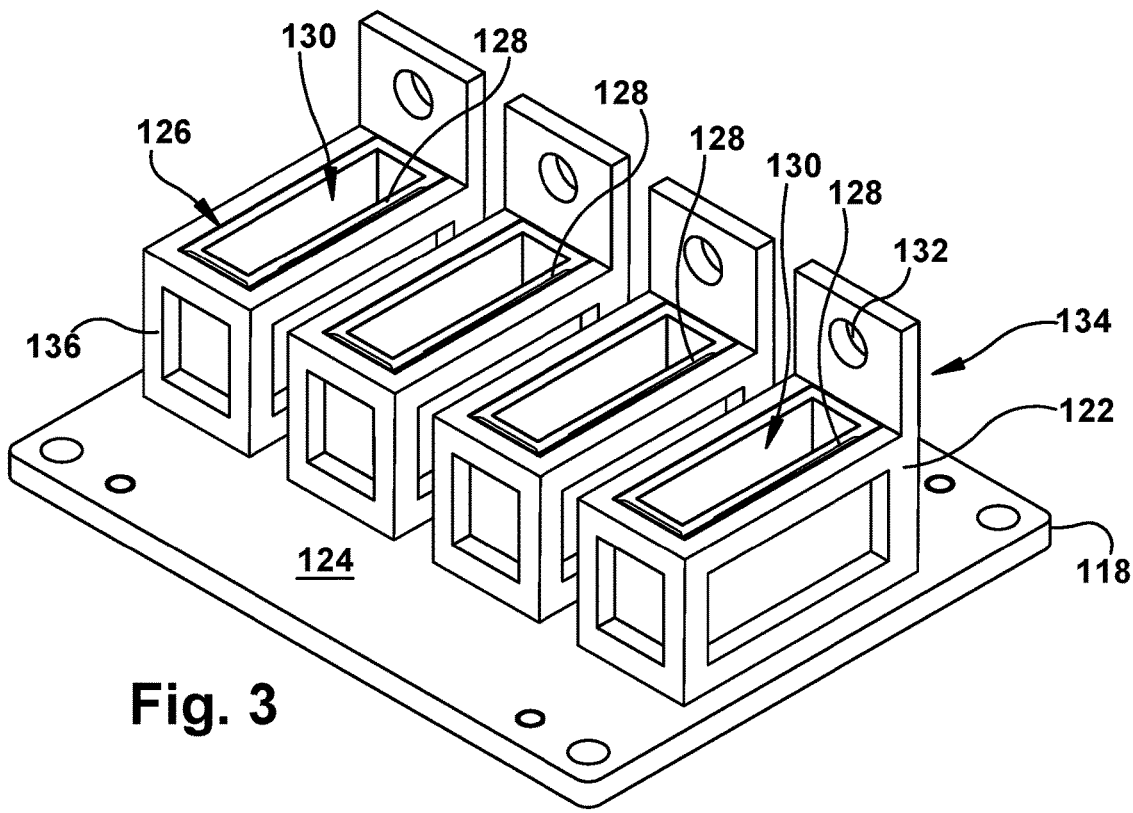
FIG. 3 shows a perspective view of the component retention plate of FIG. 2 including the incomplete components positioned therein, according to embodiments of the disclosure.

Turning to FIGS. 2 and 3, and with continued reference to FIG. 1, perspective views of component retention plate 118 and incomplete component 128 are shown. Specifically, FIG. 2 shows an enlarged, exploded, perspective view of component retention plate 118 and incomplete component 128, and FIG. 3 shows an enlarged, perspective view of component retention plate 118, and incomplete components 128 positioned therein. It is understood that similarly numbered and/or named components may function in a substantially similar fashion. Redundant explanation of these components has been omitted for clarity.

As shown in FIGS. 1-3, each of the plurality of component holders 122 includes a conduit opening 132 formed therein. In the non-limiting example shown, each of the plurality of component holders 122 may include a raised portion 134 formed adjacent and/or surrounding a portion of aperture 126, and conduit opening 132 formed through raised portion 134. Raised portion 134 may include a portion of a sidewall of component holder 122 that extends above recess 130 and/or the remaining sidewalls forming component holders 122 of component retention plate 118. As shown in FIGS. 1-3, conduit opening 132 may be formed through raised portion 134, and as a result, may be positioned above aperture 126 of component holder 122. Opening 132 formed through each component holder 122 of component retention plate 118 may receive a delivery conduit (see, FIGS. 8 and 9) for fluidly communicating a slurry material to incomplete component 128, and more specifically recess 130, during the manufacturing process discussed herein.

Each component holder 122 of component retention plate 118 may also include at least one cutout 136 formed through the sidewall(s). That is, and as shown in FIGS. 1-3, cutout(s) 136 may be formed through sidewall(s) of each of the plurality of component holders 122. Cutout(s) 136 may provide visibility of a portion of incomplete component 128 during the manufacturing process discussed herein. As a result, visual inspection of incomplete components 128 positioned within component holders 122 may be performed during the manufacturing process. Additionally, or alternatively, cutout(s) 136 formed through each of the plurality of component holders 122 of component retention plate 118 may provide flexibility to component holders 122 during the manufacturing process. Increasing flexibility of component holders 122 may decrease the risk of damaging or breaking incomplete component 128 when it is vibrated during the manufacturing process discussed herein. The increased flexibility may be especially important when incomplete component 128 is formed from a substantially brittle material, such as ceramic or glass.

As shown in FIGS. 2 and 3, each of the plurality of component holders 122 of component retention plate 118 may also include a plurality of bumpers 138. The plurality of bumpers 138 may be formed within aperture 126 of each component holders 122. More specifically, plurality of bumpers 138 may be formed on an internal surface 140 of aperture 126 formed in each component holders 122, and may be positioned adjacent cutout(s) 136 formed through component holders 122. As shown in FIG. 3, the plurality of bumpers 138 may at least partially surround and/or may substantially contact incomplete component 128 received by component holders 122. That is, when incomplete component 128 is positioned within aperture 126 of component holder 122, the plurality of bumpers 138 may substantially surround and/or may substantially contact incomplete component 128. The plurality of bumpers 138 may act as a buffer between incomplete component 128 and component holder 122, and may substantially protect incomplete component 128 from contacting rigid component holder 122. Additionally where the plurality of bumpers 138 contact incomplete component 128, the plurality of bumpers 138 may substantially hold incomplete component 128 within aperture 126 during the manufacturing process, and more specifically, when vibration platform 102 and component retention plate 122 are vibrating incomplete component 128. In non-limiting examples, the plurality of bumpers 138 may be formed from substantially pliable material, such as, textiles, polymer, or foam. As a result, when incomplete component 128 contacts the plurality of bumpers 138, for example when vibrating, the plurality of bumpers may substantially compress, deform, condense, and/or give to cushion incomplete component 128 during the manufacturing process.

Figure 4:
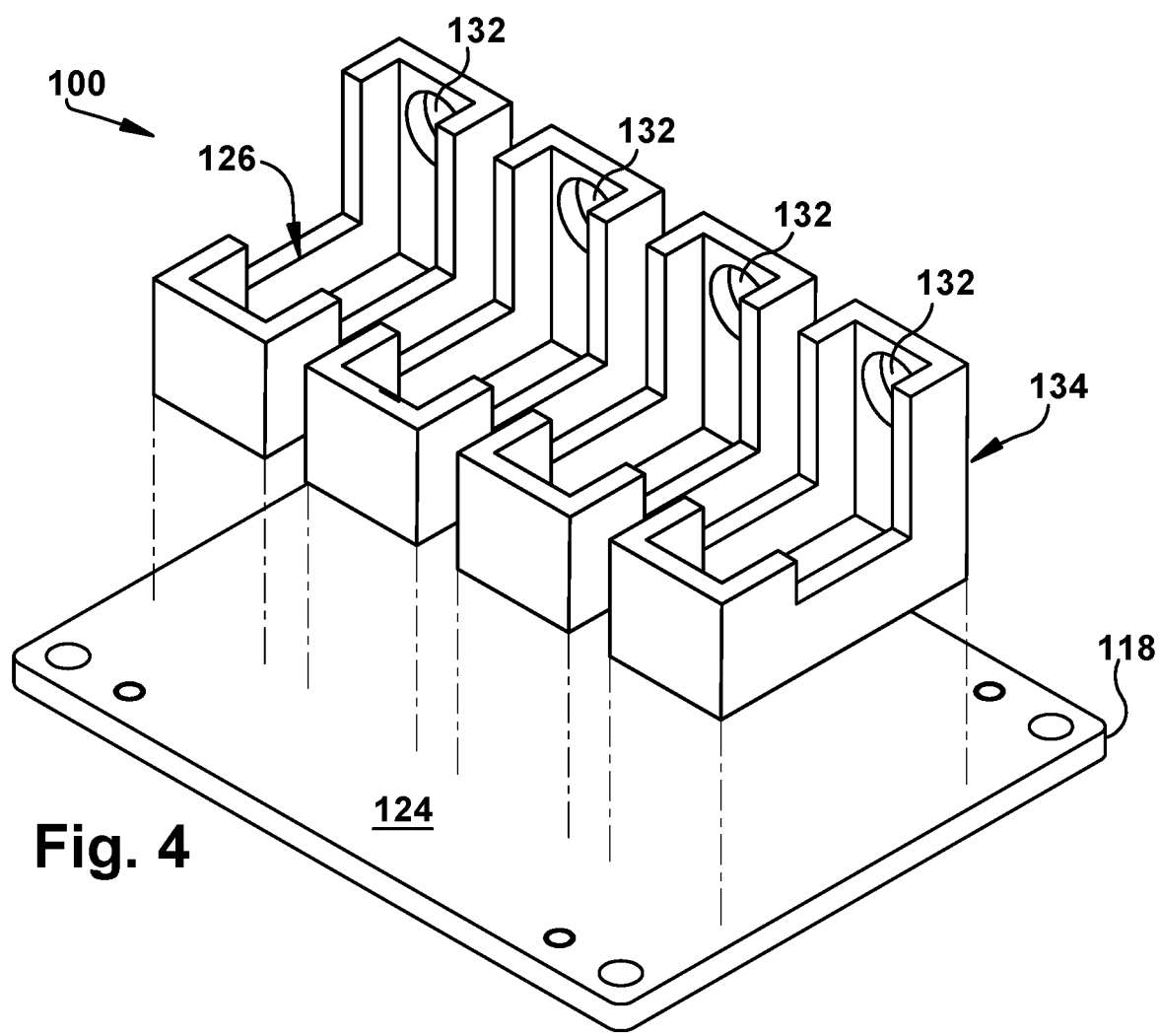
FIG. 4 shows an exploded, perspective view of a component retention plate of the vibration system of FIG. 1, according to additional embodiments of the disclosure.
Figure 5:
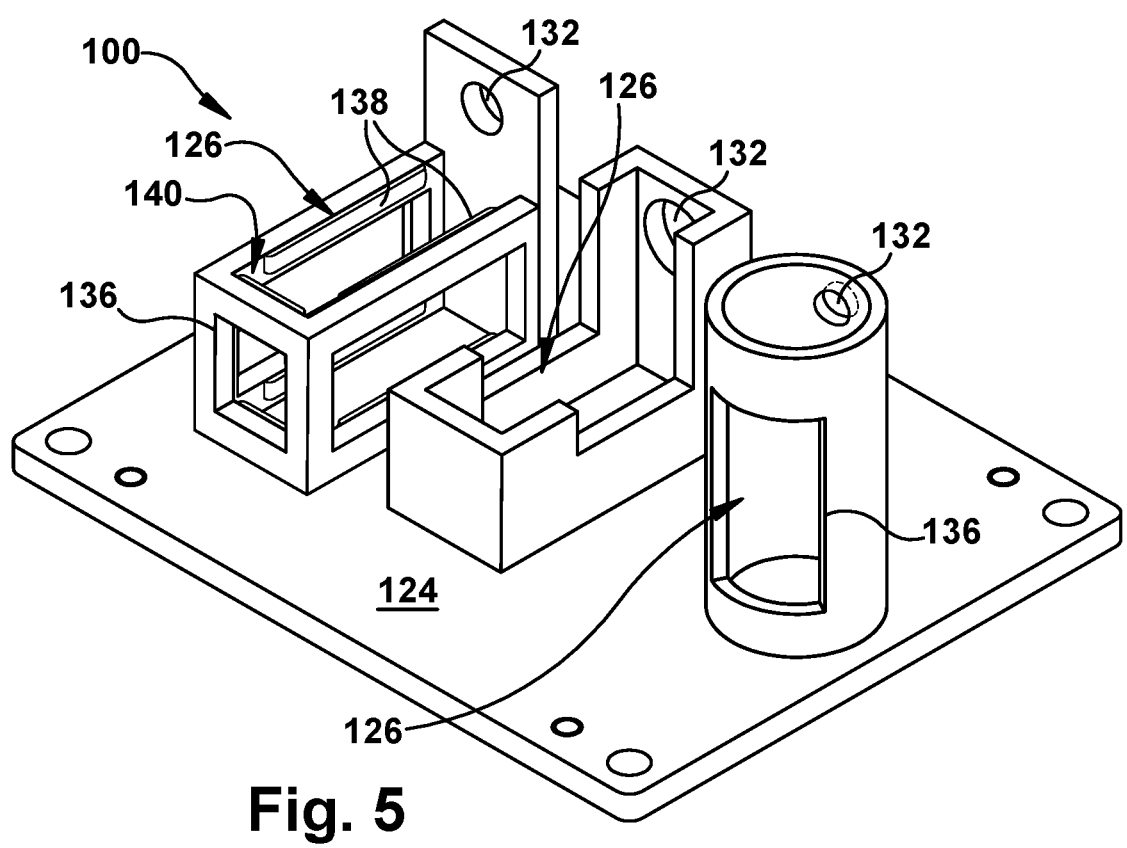
FIG. 5 shows a perspective view of a component retention plate of the vibration system of FIG. 1, according to another embodiment of the disclosure.

FIG. 4 shows a perspective view of another non-limiting example of component retention plate 118 and incomplete component 128, respectively. In the non-limiting example shown in FIG. 4, and with comparison to FIGS. 1-3, the plurality of component holders 122 may include a distinct geometry. That is, the geometry of component holders 122 and aperture 126 formed therein, as shown in FIG. 4, may be distinct when compared to the geometry of component holders 122 and aperture 126 depicted in the non-limiting example of FIGS. 1-3. This may be a result of the distinct geometry of incomplete component 128 shown in FIG. 4. Specifically, and as discussed herein with respect to FIG. 1, the geometry, shape, and/or configuration of component holders 122 and/or aperture 126 of component retention plate 118 may be specific to and/or may correspond to the geometry, shape, and/or configuration of incomplete component 128.

Also distinct from the non-limiting example of component retention plate 118 shown and discussed herein with respect to FIGS. 1-3, the plurality of component holders 122 may be releasably coupled to component retention plate 118 in the non-limiting example shown in FIG. 4. That is, each of the plurality of component holders 122 shown in FIG. 4 may be releasably coupled to top surface 124 of component retention plate 118. As such, the plurality of component holders 122 may be interchangeable on component retention plate 118, and/or various distinct component holders 122, configured to receive corresponding, distinct incomplete components 128, may be releasably coupled to component retention plate 118 when performing the manufacturing processes discussed herein. For example, and briefly turning to FIG. 5, distinct component holders 122, including distinct geometries and/or configurations, may be releasably coupled to top surface 124 of component retention plate 118 and may allow vibration system to perform a manufacturing process on various, distinct incomplete components 128 (not shown) positioned within corresponding component holders 122, as discussed herein.

As discussed herein, the plurality of component holders 122 of component retention plate 118 may receive incomplete component 128 and may orient or position incomplete component 128 in a predetermined orientation during the manufacturing process discussed herein. The plurality of component holders 122 may include features within aperture 126 and/or on internal surface 140 that may ensure incomplete component 128 is positioned in the predetermined orientation when received by and/or positioned within component holder 122 of component retention plate 118. The predetermined orientation of incomplete component 128 may be based on characteristic(s) of incomplete component 128. The characteristic(s) of incomplete component 128 may include, but are not limited to, the size of incomplete component 128 and/or recess 130, the shape or geometry of incomplete component 128 and/or recess 130, the position of recess 130 formed within incomplete component 128, the number of recesses 130 formed within incomplete component 128, additional unique features of incomplete component 128 and/or recess 130, and so on. Additionally, or alternatively, the predetermined orientation of incomplete component 128 may be based on characteristic(s) of a slurry material used to fill recess 130 of incomplete component 128. The characteristic(s) of the slurry material may include, but are not limited to, the composition of the slurry material, the viscosity of the slurry material, the required amount of slurry material to substantially fill recess 130 of incomplete component 128, and so on.

Figure 7:
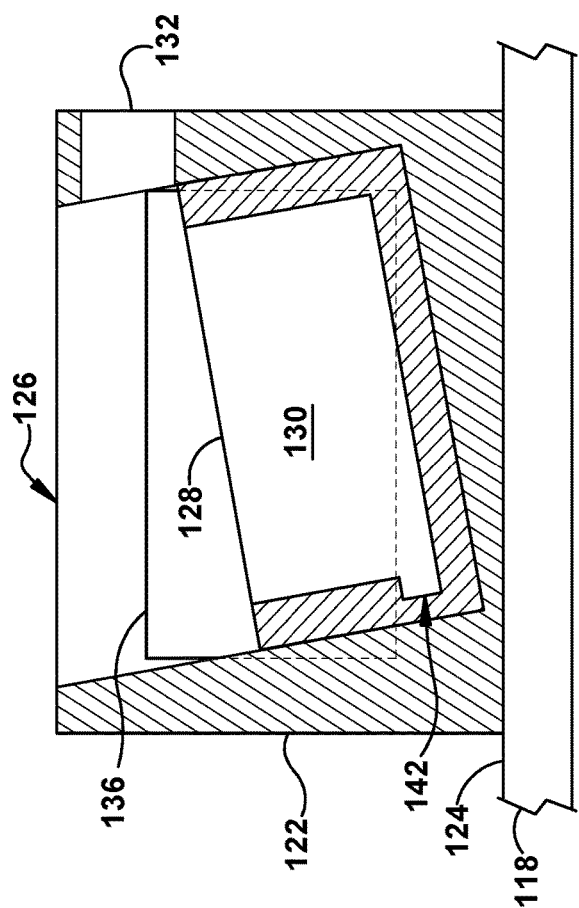
FIG. 7 shows a side, cross-section view of the component retention plate and incomplete component of FIG. 6, taken along line 7-7, according to embodiments of the disclosure.
Figure 6:
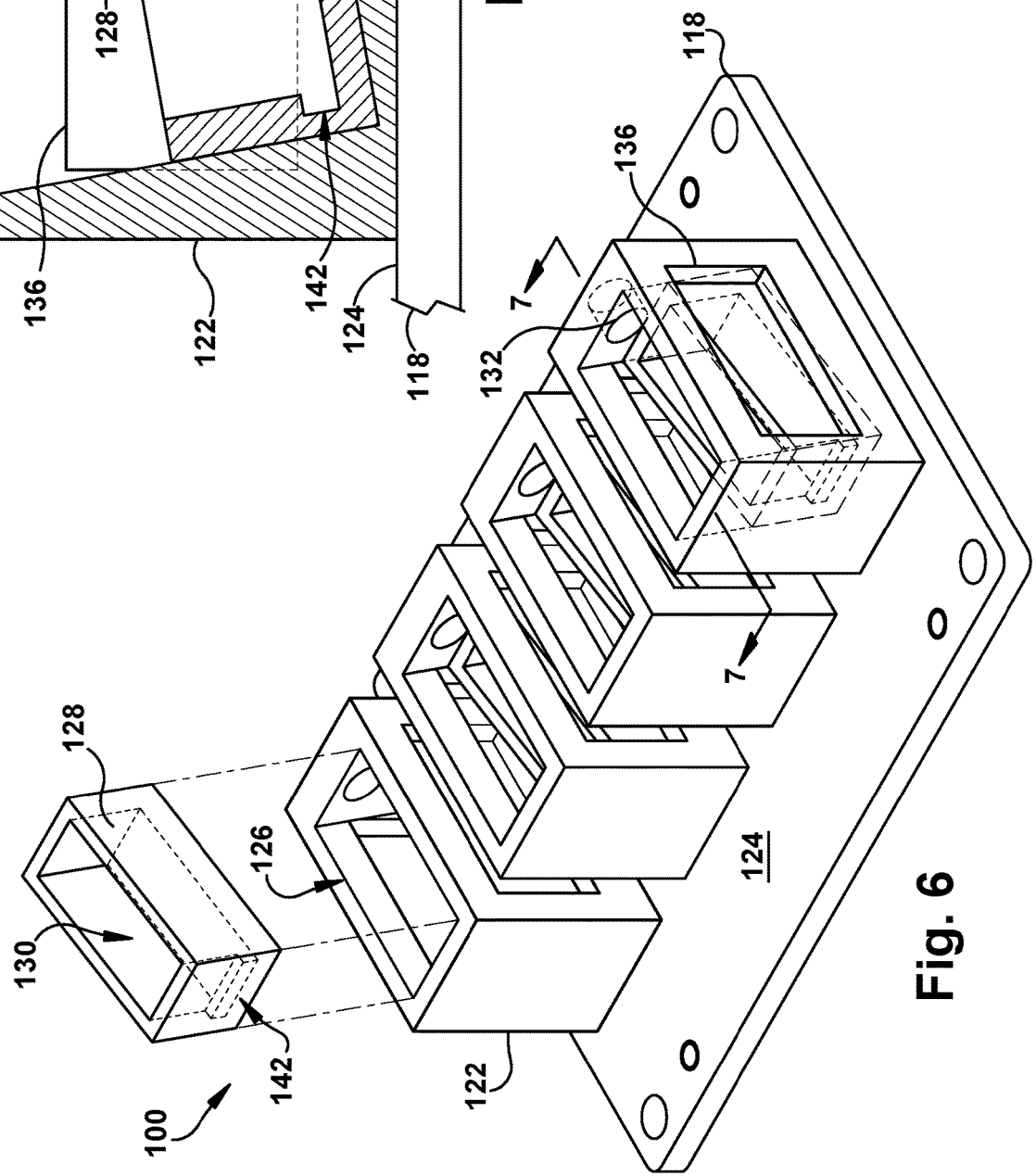
FIG. 6 shows an exploded, perspective view of a component retention plate and an incomplete component positioned therein, according to embodiments of the disclosure

FIGS. 6 and 7 show various views of another non-limiting example of component retention plate 118 and incomplete component 128 being positioned within component holder 122 and oriented in a predetermined orientation. Specifically, FIG. 6 shows an exploded, perspective view of component retention plate 118 and incomplete component 128, and FIG. 7 shows a side cross-section view of component retention plate 118 and incomplete component 128 taken along line 7-7 in FIG. 6. It is understood that similarly numbered and/or named components may function in a substantially similar fashion. Redundant explanation of these components has been omitted for clarity.

As shown in FIGS. 6 and 7, incomplete component 128 may include a unique feature formed therein. In the non-limiting example, the unique feature may include an offset compartment 142 formed as a part of recess 130. That is, recess 130 formed in incomplete component 128 may include offset compartment 142 (e.g., unique feature) formed toward the bottom of incomplete component 128. The formation of offset compartment 142 in recess 130 may result in recess 130 of incomplete component 128 being asymmetrical. As a result of recess' 130 asymmetry, the predetermined orientation of incomplete component 128 may not be substantially flat or level (see, FIGS. 1-3). Rather, as a result of the formation of offset compartment 142 in recess 130 of incomplete component 128, the predetermined orientation of incomplete component 128 within component holder 122 may be substantially angled, inclined, tilted, and/or skewed. As shown in the non-limiting examples in FIGS. 6 and 7, each of the plurality of component holders 122 may include aperture 126 having a unique geometry to substantially angle, incline, tilt, and/or skew incomplete component 128 when positioned therein. Specifically, when positioned in component holder 122, incomplete component 128 may be angled or inclined such that offset compartment 142 of recess 130 is positioned lower than the remaining portions of recess 130. By angling incomplete component 128 and/or positioning offset compartment 142 of recess 130 lower than the remaining portions of recess 130, the quality of the complete component manufactured from incomplete component 128 using vibration system 100 may be improved. For example, and as discussed herein, angling incomplete component 128 and/or positioning offset compartment 142 of recess 130 lower than the remaining portions of recess 130 may substantially ensure that the slurry material deposited into recess 130 completely fills offset compartment 142 of recess 130. Additionally, angling incomplete component 128 and/or positioning offset compartment 142 of recess 130 lower than the remaining portions of recess 130 may substantially ensure that all air pockets formed in the slurry material deposited into recess 130 are removed when performing the vibration process on component retention plate 118 include component holders 122 shown in FIGS. 6 and 7.

Figure 8:
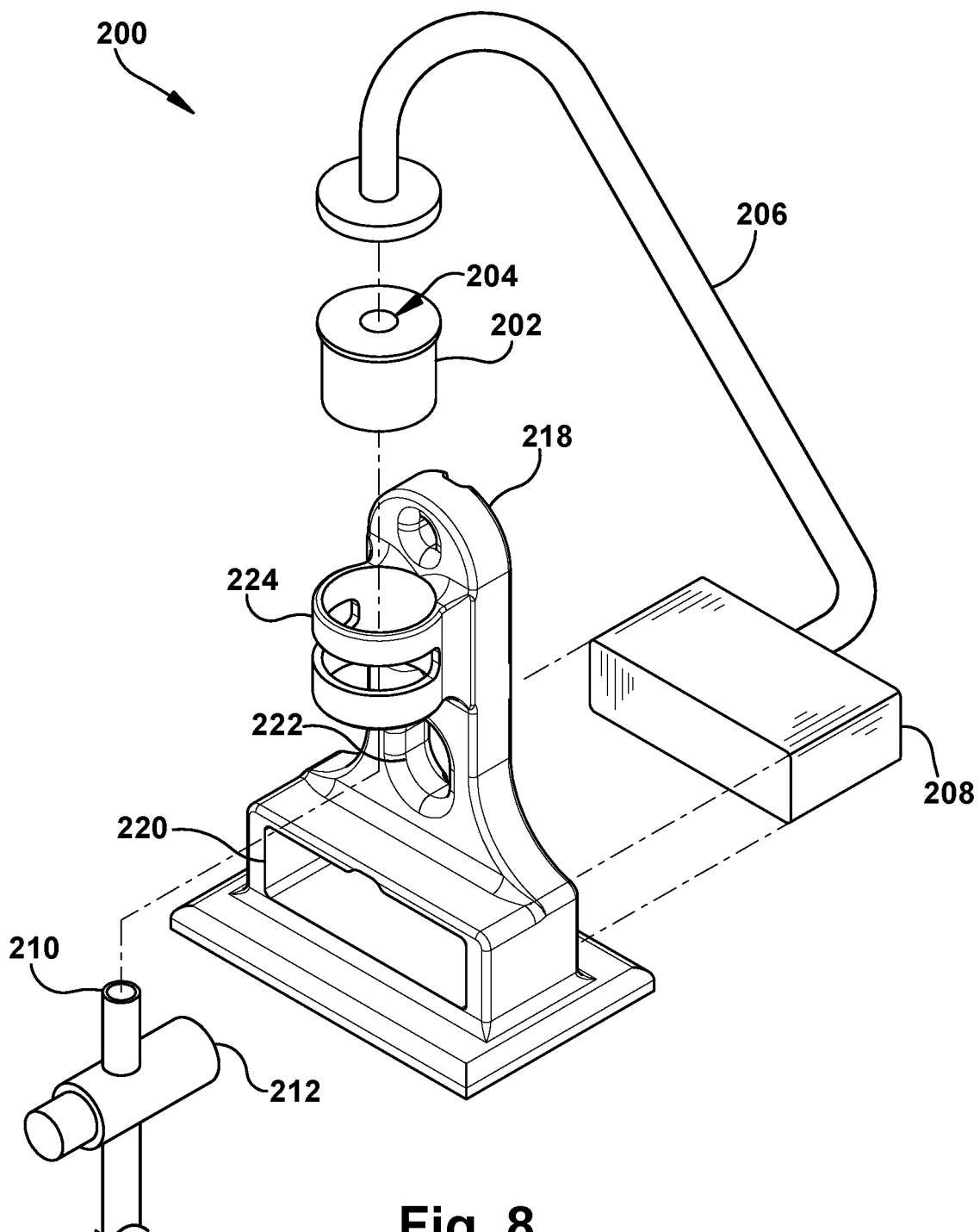
FIG. 8 shows an exploded, perspective view of a material dispensing system including slurry material, according to embodiments of the disclosure.

FIG. 8 includes exploded perspective view of material dispensing system 200. Material dispensing system 200 may be utilized with vibration system 100 (see, FIG. 9) to form or manufacture a completed component from incomplete component 128. More specifically, material dispensing system 200 may be operably connected to, and/or in communication with vibration system 100, and may be configured to aid in the manufacturing of a component from incomplete component 128.

Material dispensing system 200 may include at least one cartridge 202. Each cartridge 202 of material dispensing system 200 may include a standard size. That is, the exterior size, shape, and/or dimension of each cartridge 202 may be a single, standard or universal size, shape, and/or dimension for each cartridge 202 utilized within material dispensing system 200. As discussed herein, the single, standard or universal size, shape, and/or dimension for each cartridge 202 may allow material dispensing system 200, and other components therein, to use cartridges 202 interchangeably.

Cartridge(s) 202 of material dispensing system 200 may be configured to receive or hold a predetermined amount of slurry material used to fill recess 130 of incomplete component 128 (see, FIG. 1). As shown in FIG. 8, cartridge(s) 202 may also include a material chamber 204. Material chamber 204 may be formed in cartridge(s) 202 may hold the predetermined amount of slurry material. Distinct from the standard size of the exterior of cartridge(s) 202, each cartridge 202 may hold a distinct, predetermined amount of the slurry material. That is, the size, shape, dimension, and/or volume of each material chamber 204 formed in the various cartridges 202 may be distinct from one another. As a result, each cartridge 202 of material dispensing system 200 may hold a distinct or unique predetermined amount of the slurry material. The volume of material chamber 204, and/or the specific cartridge 202 utilized by material dispensing system 200 during the manufacturing process may be dependent on a variety of factors. For example, and as discussed herein, the size of recess 130 of incomplete component 128 and/or the number of incomplete components 128 included on component retention plate 118 may determine the cartridge 202 used and/or the volume of material chamber 204.

As shown in FIG. 8, a plurality of fluid conduits may be in fluid communication with cartridge(s) 202 of material dispensing system 200. For example, an air pressure conduit 206 may each be in fluid communication and/or fluidly coupled to cartridge(s) 202 holding the slurry material. Air pressure conduit 206 may fluidly couple a fluid dispensing unit 208 (hereafter, "FD unit 208") with cartridge(s) 202. That is, air pressure conduit 206 may be positioned between and may fluidly communicate an air pressure and/or air force, generated by FD unit 208, to cartridge(s) 202; and more specifically, material chamber 204 of cartridge(s) 202. During the manufacturing process, FD unit 208 may be configured to provide an air pressure to material chamber 204 via air pressure conduit 206 to move the slurry material held therein through distinct conduits of material delivery system 200, as discussed herein. FD unit 208 may be any suitable component, assembly, and/or system that may be configured to provide an air pressure and/or an air force to material chamber 204 of cartridge(s) 202 via air pressure conduit 206.

A delivery conduit 210 may also be in fluid communication with cartridge(s) 202 of material delivery system 200. More specifically, delivery conduit 210 may be fluidly coupled to and/or in fluid communication with material chamber 204 of cartridge(s) 202, opposite air pressure conduit 206. Delivery conduit 210 may be configured to receive the slurry material held in material chamber 204 of cartridge(s) 202. As discussed herein, FD unit 208 may provide an air pressure to material chamber 204 to move the slurry material held therein to and substantially through delivery conduit 210 during the manufacturing process. Additionally as discussed herein, delivery conduit 210 may fluidly communicate the slurry material from cartridge(s)

202 to each incomplete component 128 received by component holders 122 positioned on component retention plate 118.

As shown in FIG. 8, material dispensing system 200 may also include a valve 212 in fluid communication with delivery conduit 210. That is, valve 212 may be positioned on, within, and/or in fluid communication with delivery conduit 210. Valve 212 may be positioned on and/or in fluid communication with delivery conduit 210 to control (e.g., start, stop, restrict flow rate, and so on) the flow of the slurry material dispensed from cartridge(s) 202, and more specifically, material chamber 204 of cartridges 202. Valve 212 may be formed as any suitable component, apparatus, or assembly that may be configured to control the flow of the slurry material from cartridge(s) 202. In non-limiting examples, valve 212 may be formed as a solenoid valve, gate valve, ball valve, butterfly valve, and any other valves that may be configured to control the flow of the slurry material dispensed from cartridge(s) 202.

Material dispensing system 200 may also include support 218. Support 218 may be configured to receive, contain, and/or hold various features, apparatuses, and/or assemblies of material dispensing system 200. For example, support 218 of material dispensing system 200 may include a first slot 220 formed adjacent the base of support 218. First slot 220 may be sized and/or configured to receive and/or house FD unit 208 of material dispensing system 200. As shown in the non-limiting example of FIG. 8, support 218 may also include a second slot 222 formed substantially above first slot 220. Second slot 222 of support 218 may be sized and/or configured to receive valve 212 in fluid communication with delivery conduit 210.

Also shown in FIG. 8, support 218 may include a cartridge sleeve 224. Cartridge sleeve 224 of support 218 may be configured to receive cartridge(s) 202 holding the predetermined amount of slurry material. That is, and as shown in FIG. 8, all cartridges 202 including standard size, but distinct material chambers 204, may be received, held, and/or supported within cartridge sleeve 224 of support 218. Cartridge sleeve 224 may be formed integral with support 218, or alternatively, may be formed as a separate feature that may be coupled and/or affixed to support 218. In the non-limiting example shown in FIG. 8, cartridge sleeve 224 may be formed or positioned on support 218 above first slot 220, and second slot 222, respectively. In other non-limiting examples, cartridge sleeve 224 may be position below at least one of first slot 220, and second slot 222, or alternatively, may be positioned between first slot 220 and second slot 222.

As a result of including first slot 220, second slot 222, and cartridge sleeve 224, various features, apparatuses, and/or assemblies may all be contained within support 218, and/or may not be positioned independent from other features, apparatuses, and/or assemblies of material dispensing system 200. That is, material dispensing system 200, and its various features (e.g., cartridge(s) 202, FD unit 208, valve 212, and so on) may all be substantially contained and/or position within support 218.

Figure 9:
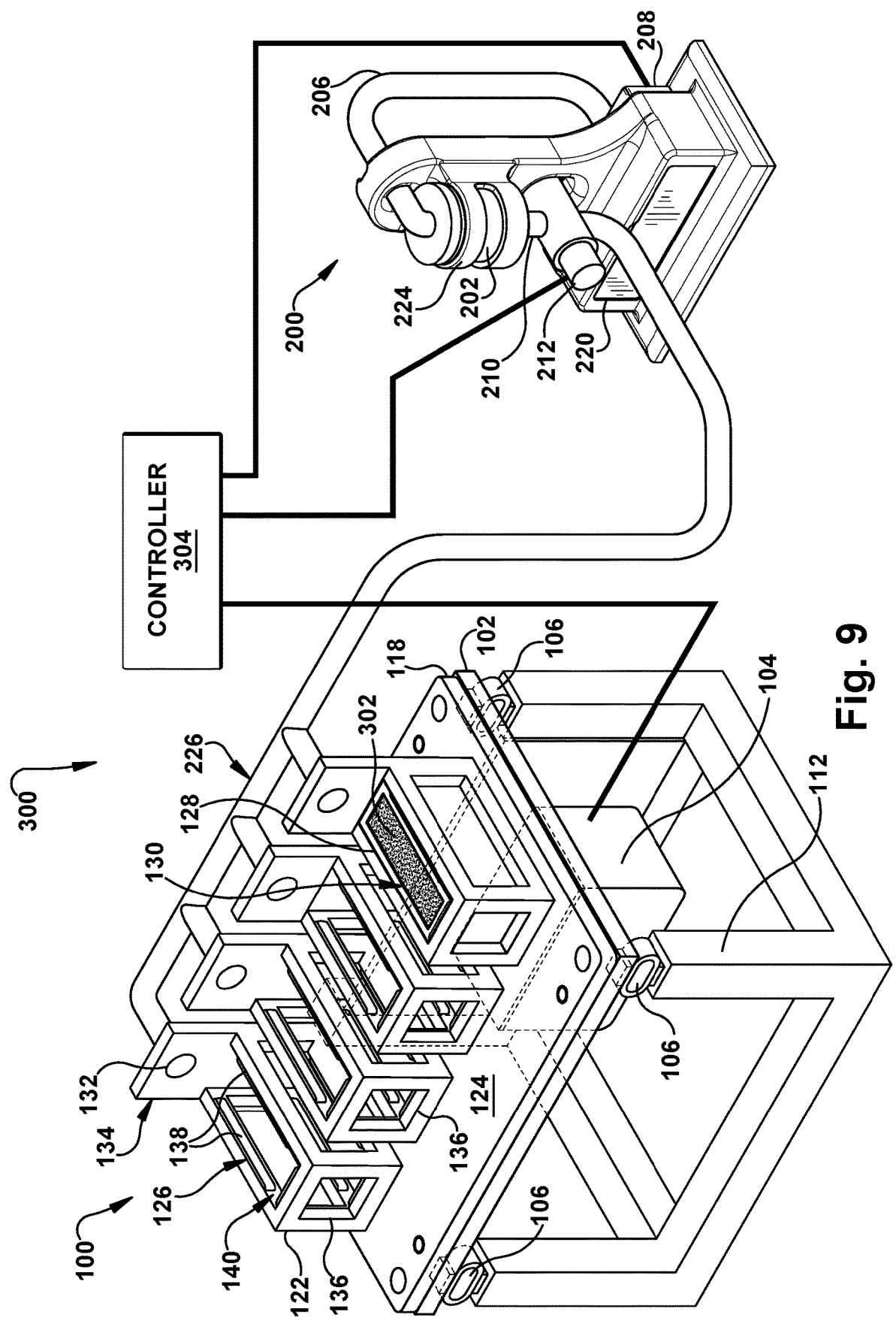
FIG. 9 shows a perspective view of a system including the vibration system of FIG. 1, the material dispensing system of FIG. 8, and a control system, according to embodiments of the disclosure.

FIG. 9 shows a manufacturing system 300 including vibrating system 100 of FIG. 1, and material dispensing unit 200 of FIG. 8. As discussed herein, manufacturing system 300 may be configured to form a complete component from incomplete component 128. It is understood that similarly numbered and/or named components may function in a substantially similar fashion. Redundant explanation of these components has been omitted for clarity.

As shown in FIG. 9, and as discussed briefly herein with respect to FIGS. 1 and 8, opening 132 formed through each component holder 122 of component retention plate 118 in vibration system 100 may receive delivery conduit 210 of material dispensing system 200 for fluidly communicating a slurry material 302 to incomplete component 128. Specifically, and as shown in FIG. 9, delivery conduit 210 may split, divide, and/or form a delivery manifold portion 226, where each conduit of delivery manifold portion 226 of delivery conduit 210 is positioned within and/or received by opening 132 formed in component holders 122 of component retention plate 118. Additionally, and as a result of opening 132 being formed in raised portion 134 of each component holder 122, delivery manifold portion 226 of delivery conduit 210 may be positioned above incomplete component 128 and/or recess 130 formed in incomplete component 128. As discussed herein, delivery conduit 210, and more specifically delivery manifold portions 226 of delivery conduit 210 may deliver and/or dispense slurry material 302 into recess 130 of each incomplete component 128 positioned within component holders 122 of component retention plate 118 in vibration system 100.

As shown in FIG. 9, manufacturing system 300 and/or vibration system 100 may include a control system 304. Control system 304 may be in communication with vibration system 100 and material dispensing system 200, respectively. More specifically, and as shown in FIG. 9, control system 304 may be operably connected to and/or in communication with motor 104 of vibration system 100, and FD unit 208 and valve 212, respectively, of material dispensing system 200. In the non-limiting example, control system 304 of vibration system 100 and/or manufacturing system 300 may be configured to control the function and/or operation of the various features of vibration system 100 and material dispensing system 200, respectively, with which control system 304 is in communication. For example, control system 304 in communication with motor 104 of vibration system 100 may be configured to adjust an operational vibration frequency of motor 104 to equal the predetermined vibration frequency for motor 104 and/or vibration platform 102. In another non-limiting example, control system 304 in communication with FD unit 208 of material dispensing system 200 may be configured to adjust the air pressure or air force provided to cartridge(s) 202. Additionally, control system 304 in communication with valve 212 of material dispensing system 200 may be configured to adjust a flow of slurry material 302 through delivery conduit 210 to incomplete components 128. Control system 304 may adjust the flow of slurry material 302 by opening valve 212 to allow slurry material 302 to flow through delivery conduit 210, closing valve 212 to stop slurry material 302 from flowing through delivery conduit 210, or partially opening valve 212 to allow slurry material 302 to flow through delivery conduit 210 at a reduced flow rate.

Control system 304 may be configured as any suitable computer and/or computing system. That is, control system 304 may be any suitable computer and/or computing system that may be configured to be in communication with the various features of vibration system 100 and material dispensing system 200 and perform the functions or operations discussed herein.

With continued reference to FIG. 9, the manufacturing process for forming a complete component from incomplete component 128 using manufacturing system 300 may be discussed. A plurality of incomplete components 128 may be inserted, positioned within, and/or received by corresponding component holders 122 of component retention plate 118 of vibration system 100. Once positioned within aperture 126 of component holders 122, and surrounded/contacted by bumpers 138, slurry material 304 may be begin to be deposited from material dispensing system 200 into recess 130 formed in each incomplete component 128. Specifically, FD unit 208 may provide an air pressure to material chamber 204 of cartridge 202 via air pressure conduit 206, and slurry material 304 held within cartridge 202 may be provided to and flow through delivery conduit 210. Slurry material 304 may flow through delivery conduit 210 and be delivered to recess 130 of incomplete components 128 via delivery manifold portions 226 positioned through and/or received by conduit openings 132 formed in component holders 122. When a predetermined amount of slurry material 304 is deposited into recess 130 of incomplete component 128, valve 212 may be adjusted, and more specifically shut, to stop the flow of slurry material 304 through delivery conduit 210. Additionally, FD unit 208 may also stop providing an air pressure to cartridge 202 via air pressure conduit 206 to prevent anymore slurry material 304 from being provided to delivery conduit 210.

Prior to, during, and/or subsequent the deposition of slurry material 304 into recess 130 of each incomplete component 128, vibration system 100 may vibration incomplete component 128. More specifically, and as discussed herein, motor 104 may vibrate vibration platform 102 and component retention plate 118, including component holders 122 and incomplete component 128, at a predetermined vibration frequency. In a non-limiting example, vibration platform 102 and component retention plate 118 may begin vibrating prior to slurry material 304 being deposited into each incomplete component 128 to substantially fill recess 130. In another non-limiting example, vibration platform 102 and component retention plate 118 may begin vibrating after a portion of slurry material 304 is deposited into each incomplete component 128 but prior to substantially filling recess 130, and/or stopping the flow of slurry material 304 to incomplete component 128. In an additional non-limiting example, vibration platform 102 and component retention plate 118 may begin vibrating after all of the desired or predetermined amount of slurry material 304 is deposited into each incomplete component 128 to substantially filling recess 130, and/or after stopping the flow of slurry material 304 to incomplete component 128. In the non-limiting examples, motor 104 may vibrate vibration platform 102, component retention plate 118, and incomplete component 128 substantially filled with slurry material 304 (e.g., recess 130 may be substantially filled with slurry material 304) for a predetermined amount of time before stopping vibrations to let incomplete component 128 substantially filled with slurry material 304 to settle before undergoing additional processing (e.g., firing, annealing, shaping, polishing, and so on).

As discussed herein, vibrating vibration platform 102, component retention plate 118, and incomplete component 128 including slurry material 304 may improve the build, manufacture and/or component quality. For example, vibrating incomplete component 128 may temporarily and artificially reduce the viscosity of slurry material 304 deposited into recess 130 of incomplete component 128. As a result of the "reduced viscosity" of slurry material 304 due to vibrating incomplete component 128, vibration system 100 and/or manufacturing system 300 may ensure that all portions of recess 130 of incomplete component 128 are completely and desirably filled with slurry material 304. In another non-limiting example, vibrating vibration platform 102, component retention plate 118, and incomplete component 128 including slurry material 304 may ensure that all air bubbles or air pockets formed as a result of depositing slurry material 304 into recess 130 via delivery conduit 210 may be moved to the surface of deposited slurry material 304 and dissipated into the atmosphere surrounding incomplete component 128.

Additionally as discussed herein, the predetermined vibration frequency for vibrating vibration platform 102, and in turn component retention plate 118 and incomplete component 128 including slurry material 304, may be dependent, at least in part on, characteristic(s) of incomplete component 128. The characteristic(s) for incomplete component 128 that may determine the vibration frequency for vibrating vibration platform 102 may include, but are not limited to, the size of incomplete component 128 and/or recess 130, the shape or geometry of incomplete component 128 and/or recess 130, the position of recess 130 formed within incomplete component 128, the number of recesses 130 formed within incomplete component 128, additional unique features of incomplete component 128 and/or recess 130, and so on. Additionally, or alternatively, the predetermined vibration frequency for vibrating vibration platform 102 may be based on characteristic(s) of slurry material 304 used to fill recess 130 of incomplete component 128. The characteristic(s) of slurry material 304 may include, but are not limited to, the composition of slurry material 304, the viscosity of slurry material 304, the required amount of slurry material 304 to substantially fill recess 130 of incomplete component 128, and so on.

The technical effect is to provide systems including vibration systems for at least partially filling incomplete components with slurry material during a manufacturing process.

The block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As discussed herein, various systems and components are described as "obtaining" data (e.g., obtaining incomplete component characteristics, etc.). It is understood that the corresponding data can be obtained using any solution. For example, the corresponding system/component can generate and/or be used to generate the data, retrieve the data from one or more data stores (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s). As used herein, "approximately" indicates +/−10% of the value, or if a range, of the values stated.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A vibration system, comprising:
   a vibration platform;
   a component retention plate releasably coupled to the vibration platform, the component retention plate including:
      a plurality of component holders positioned on the component retention plate, each of the plurality of component holders receiving a distinct, incomplete component in a predetermined orientation; and
   a motor operatively coupled to the vibration platform to vibrate the vibration platform at a predetermined frequency based on a characteristic of each of the incomplete components;
   wherein each of the plurality of component holders include a plurality of bumpers at least partially surrounding and substantially contacting the incomplete component received by each of the plurality of component holders.

2. The vibration system of claim 1, wherein each of the plurality of component holders are releasably coupled to the component retention plate.

3. The vibration system of claim 1, further comprising:
   a plurality of dampeners positioned between and affixed directly to the vibration platform and a rigid base.

4. The vibration system of claim 1, wherein each of the plurality of bumpers are formed from a substantially pliable material.

5. The vibration system of claim 1, wherein the characteristic of the incomplete components includes at least one of:
   a geometry of the incomplete components,
   a feature of the incomplete components, or
   a composition of a slurry material delivered to and at least partially filling the incomplete components.

6. The vibration system of claim 5, wherein each of the plurality of component holders includes an opening for receiving a delivery conduit for fluidly communicating the slurry material to the incomplete component.

7. The vibration system of claim 1, wherein the predetermined orientation of each incomplete component is based on the characteristic of each of the incomplete components.

8. The vibration system of claim 1, further comprising a control system in communication with the motor, the control system adjusting an operational vibration frequency to equal the predetermined frequency.

9. A system, comprising:
   a vibration system including:
      a vibration platform;
      a component retention plate releasably coupled to the vibration platform, the component retention plate including:
         a plurality of component holders positioned on the component retention plate, each of the plurality of component holders receiving a distinct, incomplete component in a predetermined orientation; and
      a motor operatively coupled to the vibration platform to vibrate the vibration platform at a predetermined frequency based on a characteristic of each of the incomplete components; and
   a material dispensing system in communication with the component retention plate of the vibration system, the material dispensing system including:
      a cartridge holding a predetermined amount of a slurry material;

a delivery conduit fluidly communicating the slurry material from the cartridge to each of the incomplete components received by the plurality of component holders position on the component retention plate; and a valve in fluid communication with the delivery conduit to control the flow of the slurry material from the cartridge.

10. The system of claim 9, further comprising a control system in communication with the motor of the vibration system and the valve of the material dispensing system, the control system configured to:

adjust an operational vibration frequency to equal the predetermined frequency; and adjust a flow of the slurry material through the delivery conduit.

11. The system of claim 9, wherein each of the plurality of component holders of the vibration system are releasably coupled to the component retention plate.

12. The system of claim 9, wherein the vibration system further comprises:

a plurality of dampeners positioned between and affixed directly to the vibration platform and a rigid base.

13. The system of claim 9, wherein each of the plurality of component holders of the vibration system include:

a plurality of bumpers at least partially surrounding and substantially contacting the incomplete component received by each of the plurality of component holders.

14. The system of claim 13, wherein each of the plurality of bumpers are formed from a substantially pliable material.

15. The system of claim 9, wherein the characteristic of the incomplete components includes at least one of:

a geometry of the incomplete components, a feature of the incomplete components, or a composition of the slurry material delivered to and at least partially filling the incomplete components.

16. The system of claim 9, wherein each of the plurality of component holders of the vibration system includes an opening for receiving the delivery conduit of the material dispensing system.

17. The system of claim 9, wherein the predetermined orientation of each incomplete component is based on the characteristic of each of the incomplete components.

18. The system of claim 9, wherein the material dispensing system further includes a support including a cartridge sleeve, the cartridge sleeve receiving the cartridge holding the predetermined amount of the slurry material.

19. The system of claim 18, wherein the cartridge of the material dispensing system includes a plurality of cartridges, each of the plurality of cartridges holding distinct, predetermined amounts of the slurry material and interchangeably received by the cartridge sleeve of the support.

* * * * *